(12) United States Patent
Son

(10) Patent No.: US 9,224,241 B2
(45) Date of Patent: Dec. 29, 2015

(54) SYSTEM FOR PRODUCING DIGITAL HOLOGRAPHIC CONTENT

(71) Applicant: ELECTRONICS AND TELECOMMUNICATIONS RESEARCH INSTITUTE, Daejeon (KR)

(72) Inventor: Wookho Son, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 390 days.

(21) Appl. No.: 13/716,064

(22) Filed: Dec. 14, 2012

(65) Prior Publication Data

US 2013/0162637 A1    Jun. 27, 2013

(30) Foreign Application Priority Data

Dec. 27, 2011    (KR) .................. 10-2011-0143065

(51) Int. Cl.
| | |
|---|---|
| *G06T 17/00* | (2006.01) |
| *G03H 1/08* | (2006.01) |
| *G03H 1/22* | (2006.01) |
| *G03H 1/00* | (2006.01) |

(52) U.S. Cl.
CPC *G06T 17/00* (2013.01); *G03H 1/08* (2013.01); *G03H 1/2294* (2013.01); *G03H 2001/0088* (2013.01); *G03H 2001/2247* (2013.01); *G03H 2210/42* (2013.01)

(58) Field of Classification Search
CPC . G03H 2226/05; G03H 1/08; G03H 2210/30; G03H 1/0808; G03H 2210/44; G03H 2001/0825; G03H 1/0891; G03H 3/00; G03H 1/26; G03H 2227/06; G03H 2210/562; G03H 1/04; G03H 1/0248; G03H 1/0406; G09G 2300/026; G06F 17/175
See application file for complete search history.

(56) References Cited

U.S. PATENT DOCUMENTS

| | | | |
|---|---|---|---|
| 7,436,537 B2 | 10/2008 | Holzbach et al. | |
| 2010/0149314 A1* | 6/2010 | Schwerdtner et al. | .......... 348/41 |
| 2012/0223909 A1* | 9/2012 | Tse et al. | ...................... 345/174 |

FOREIGN PATENT DOCUMENTS

| | | |
|---|---|---|
| KR | 10-2009-0018147 A | 2/2009 |
| WO | WO 01/57601 A1 | 8/2001 |

* cited by examiner

*Primary Examiner* — Haixia Du

(57) ABSTRACT

Disclosed is a system for producing a digital holographic (DH) content, which includes: a 3D image information acquiring unit configured to acquire 3D information on real and virtual objects; a computer-generated hologram (CGH) processing unit configured to generate the digital holographic content by mathematical modeling from the 3D information acquired from the 3D image information acquiring unit; a DH content editing unit configured to edit the generated digital holographic content; a DH image restoring unit configured to visualize the generated digital holographic content in a 3D image; and a digital holographic content process managing unit configured to manage a parameter and a processing time of each functioning unit so as to process each processing process of each of the 3D image information acquiring unit, the computer-generated hologram processing unit, the digital holographic content editing unit, and the digital hologram image restoring unit.

18 Claims, 3 Drawing Sheets

▷ DID APPLIED TO PUBLIC FIELD
— RESTORE AND DISPLAY CULTURE ASSETS/HISTORY
— DISPLAY SIGHTSEEING/ CULTURE/ART WORKS
— MEDIA TABLE

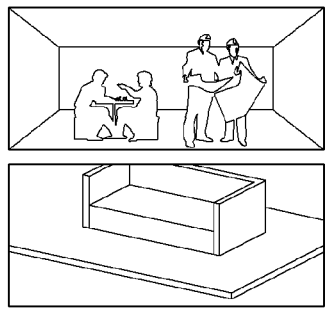

▷ TEST-OPERATED IN PUBLIC FIELD
— PROVIDE EDUCATIONAL/ PUBLIC REFERENCE MODEL

▷ KIOSK FOR ADVERTISEMENT
— RETAIL SHOP PRODUCT/ BRAND SERVICE
— MULTIPLEX THEATER CHAIN TICKETING
— USER-CUSTOMIZED CONTENT

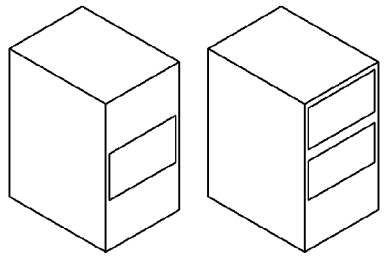

▷ OPERATING EXPOSURE-TYPE ADVERTISEMENT MODEL
— REVENUE MODEL FOR EACH PLACE/TIME
— NAKED-EYE DISPLAY, EXPOSURE ON 4 FACES AT 360°

▷ DISPLAY FOR ENTERTAINMENT (CONERT/DISPLAY)
— SPACE HOLDER (DISPLAY/ IMAGE PRESENTING SPACE)
— MEDIAL WALL/FA?ADE/ SOUND VISUALIZATION
— USER INTERACTION DH CONTENT

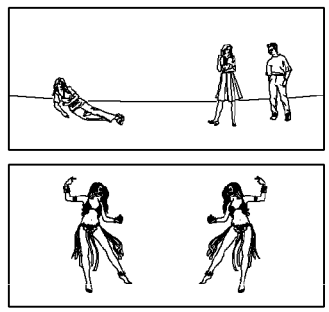

▷ OPERATING INTERACTION DH CONTENT
— OPERATING REVENUE MODEL FOR EACH EVENT/PERIOD

FIG. 3

SYSTEM FOR PRODUCING DIGITAL HOLOGRAPHIC CONTENT

CROSS-REFERENCE TO RELATED APPLICATIONS

This application is based on and claims priority from Korean Patent Application No. 10-2011-0143065, filed on Dec. 27, 2011 with the Korean Intellectual Property Office, the disclosure of which is incorporated herein in its entirety by reference.

TECHNICAL FIELD

The present disclosure relates to a system for producing a digital holographic (DH) content, and more particularly, to a system for producing a digital holographic content for systematizing and efficiently operating all processes including acquisition, generation, edition, restoration of the digital holographic content, and production of an application content on a pipeline.

BACKGROUND

In the related art, in regard to an analog hologram, a hologram is optically recorded on a special film by projecting a laser which is a coherent light source to a target object, which is used for a limited purpose such as restoration of a specific object such as cultural assets for display at an exhibit hall. A similar hologram technique is an image production technique of a stereo scheme in which a 3D image is formed in a space by using a projector and a reflecting mirror without considering an optical property of the hologram. The similar hologram technique is incapable of solving dizziness and a feeling of fatigue at the time of viewing a 3D image, which is caused in a binocular disparity scheme.

Meanwhile, in the related art, since methodology of generating the digital holographic content itself in real time by computer-generated hologram (CGH) processing is limited, problems caused at the time of viewing the 3D image cannot be fundamentally solved. Further, there is a limit without a function to efficiently generate and manage the 3D image for the specialized use in various application fields.

SUMMARY

The present disclosure has been made in an effort to provide a system and a method for producing a digital holographic (DH) content for consistently and systematically processing the digital holographic content from an initial generation step to a final application content production step, in order to apply a digital hologram to various application fields and solve a problem of an existing binocular 3D image technique.

Further, the present disclosure has been made in an effort to provide a system and a method for producing a digital holographic content for efficiently operating the digital hologram in order to manage a process in terms of processing the content by systematizing all processes including acquisition, generation, edition, restoration, image quality evaluation/human factors of the digital holographic content, and production of an application content by using a process pipeline defined as (systematical and physical) parameters.

An exemplary embodiment of the present disclosure provides a system for producing a digital holographic (DH) content, which includes: a 3D image information acquiring unit configured to acquire 3D information on real and virtual objects; a computer-generated hologram (CGH) processing unit configured to generate the digital holographic (DH) content by mathematical modeling from the 3D information acquired from the 3D image information acquiring unit; a DH content editing unit configured to edit the generated digital holographic content; a DH image restoring unit configured to visualize the generated digital holographic content in a 3D image; and a digital holographic content process managing unit configured to manage a parameter and a processing time of each functioning unit so as to process each processing process of the 3D image information acquiring unit in a pipeline scheme, the computer-generated hologram processing unit, the digital holographic content editing unit, and the digital hologram image restoring unit.

According to exemplary embodiments of the present disclosure, a series of processes including generation, edition, and production of a digital hologram can consistently and efficiently processed on a DH content process management pipeline, and production of the digital hologram specialized for each application field and production of a content optimized for user/system requirements of a target application content can be predictably achieved after pre-verification by a simulation function.

Further, dizziness and a feeling of fatigue at the time of viewing a 3D image can be fundamentally removed, which is caused from a stereo scheme based on a binocular scheme in 3D image processing technology in the related art, and a series of processes from generation of a 3D image content to production of an application content can be consistently and seamlessly processed and operated in one system.

That is, dizziness and a feeling of fatigue of viewer's eyes can be fundamentally excluded by making the most of a characteristic of the digital hologram, and a 3D image service that makes the most of a characteristic of an application field can be efficiently implemented at lost cost in a short time while the 3D image is generated.

In addition, all the processes for processing the digital holographic content, which include generation and edition of the digital holographic content, and production of an applied hologram content are pipelined to be consistently processed on a process management system so as to construct a user-created content (UCC) environment in which the digital hologram can be efficiently used by a content producer and a content user in various application fields.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 is a diagram illustrating an example of an application service which is implementable by the system for producing a digital holographic content according to the exemplary embodiment of the present disclosure.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Disclosed are a system and a method for producing a digital holographic content for systematizing and efficiently operating all processes including acquisition, generation, edition, restoration of the digital holographic content, and production of an application content on a process management pipeline in terms of digital content processing.

According to exemplary embodiments of the present disclosure, 3D information on a real object is acquired from a camera and an image sequence and 3D information on a virtual object is acquired from a 3D modeling tool, and a digital holographic (DH) content is generated through calculation by mathematically modeling a process in which a hologram is optically generated by a coherent light source by using the acquired 3D information. The generated digital holographic content is produced by editions including cutting, matching, merging, synthesizing, scaling, and the like.

Meanwhile, an image is restored by visualizing the generated digital holographic content by a computer graphic technique or optically, and multi-sensor information and multi and dual spaces by a digital hologram are recognized and an interaction is processed. An image quality of the restored digital hologram is evaluated by analyzing an influence which an optical characteristic of the hologram exerts on a human visual system and a human factor is processed.

The digital holographic content is produced to easily use the digital hologram by application programming according to a guideline in various multimedia application fields.

In this case, according to the exemplary embodiments of the present disclosure, all processes of processing the digital holographic content are made into a process and a functional characteristic of each step is parameterized in a digital holographic content process managing unit to be consistently and seamlessly operated.

Hereinafter, exemplary embodiment of the present disclosure will be described in detail with reference to the accompanying drawings. The configurations of the present disclosure and the resulting operational effects will be apparently appreciated through the detailed description described as below.

Figure 1:
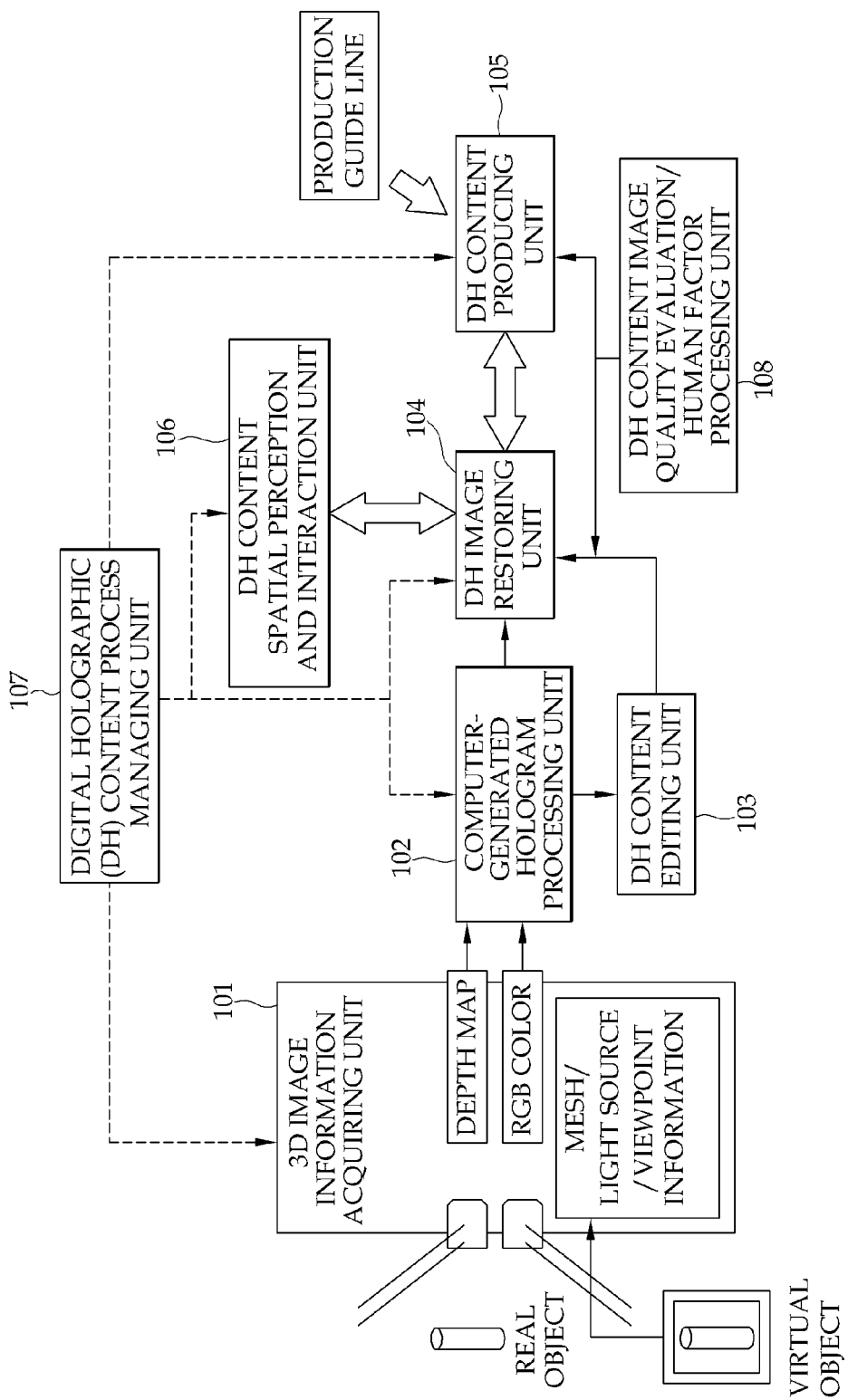
FIG. 1 is a block diagram illustrating a system for producing a digital holographic content according to an exemplary embodiment of the present disclosure.

FIG. 1 is a block diagram illustrating a system for producing a digital holographic content according to an exemplary embodiment of the present disclosure. Referring to FIG. 1, the system according to the exemplary embodiment of the present disclosure includes a 3D image information acquiring unit 101 configured to acquire 3D information on a real and/or virtual object, a computer-generated hologram processing unit 102 configured to generate the digital holographic (DH) content through mathematical calculation, a DH content editing unit 103 configured to edit the digital holographic content, a DH image restoring unit 104 configured to visualize the digital holographic content in a 3D image, a DH content producing unit 105 configured to produce the digital holographic content so as to easily use a digital hologram in various application fields by application programming, a DH content spatial perception and interaction unit 106 configured to recognize a space of a digital hologram and process an interaction by multi-sensor information and a digital hologram, a DH content process managing unit 107 configured to manage the DH content managed by a pipeline scheme so that all processes of processing the digital holographic content are consistently operated, and an image quality evaluating/human factor processing unit 108 configured to perform evaluation of an image quality by analyzing an influence which an optical characteristic of a hologram exerts on a human visual system and processing of a human factor to minimize a feeling of bodily inconvenience and a feeling of visual fatigue at the time of viewing 3D images.

First, the 3D image information acquiring unit 101 acquires 3D information on a real object from a camera and an image sequence and a virtual object from a 3D modeling tool.

The computer-generated hologram (CGH) processing unit 102 generates the digital holographic (DH) content by mathematically modeling a process in which a hologram is optically generated by a coherent light source with the acquired 3D information by the 3D image information acquiring unit 101.

The digital holographic content editing unit 103 serves to edit the digital holographic content generated through the computer-generated hologram processing unit 102 by methods including cutting, matching, merging, synthesizing, scaling, and the like.

The digital hologram image restoring unit 104 serves to visualize the digital holographic content generated by the computer-generated hologram processing unit 102 in the 3D image by using methods such as a computer graphics rendering technique through tracking light wavefront reflected on an object and an analog optical processing method of projection of a reproduction wave.

The digital hologram spatial perception and interaction unit 106 serves to perform a multi and dual spatial perception function and interaction processing by multi-sensor information and the digital hologram by interworking with the digital hologram image restoring unit 104 in accordance with a control signal of the digital holographic content process managing unit 107.

The digital hologram spatial perception and interaction unit 106 serves to distinguish and recognize a user's operation in an extended 3D space by defining 3D spatial information by multi-sensors such as an existing camera and an IR sensor and spatial information by the digital hologram, and recognizing extended multiple spatial information by merging two spaces, when the digital holographic content restored in the 3D image by the digital holographic image restoring unit 104 is operated.

The image quality evaluating/human factor processing unit 108 performs evaluation of the image quality by analyzing the influence which the optical characteristic of the hologram with respect to the digital hologram received from the digital hologram image restoring unit 104 or the digital holographic content editing unit 103 exerts on the human visual system. And The image quality evaluating/human factor processing unit 108 processes the human factor to minimize the feeling of bodily inconvenience and the feeling of visual fatigue at the time of viewing the 3D images.

The digital holographic content producing unit 105 is configured to receive production guideline information from various multimedia application fields and easily produce an applied digital hologram by user-friendly UCC environment based application programming according to the received production guideline information.

Lastly, the digital holographic content process managing unit 107 serves to make into a process all steps of processing the digital holographic content in a production pipeline type according to the exemplary embodiment and support consistent and seamless content operation by making a functional characteristic of a step processed by each functioning unit into a parameter.

Figure 2:
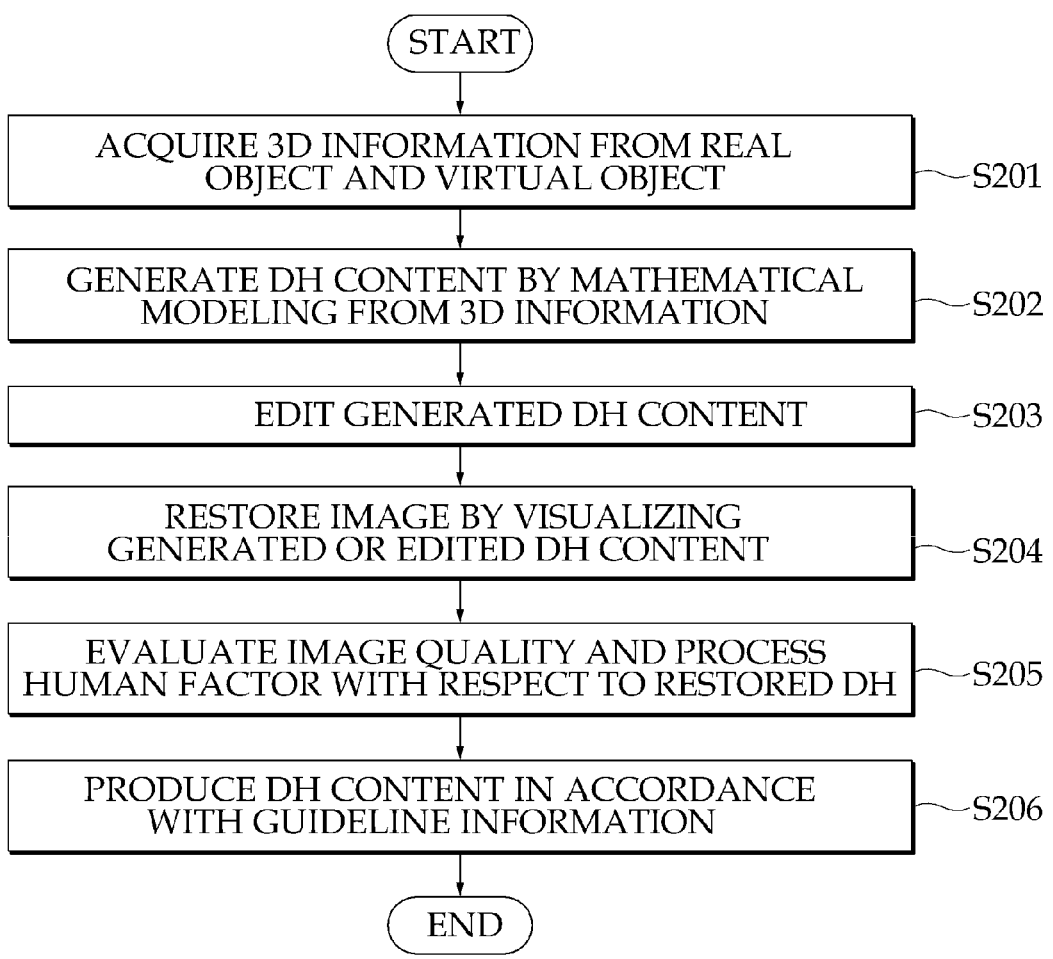
FIG. 2 is a flowchart illustrating a process of producing a digital holographic content according to an exemplary embodiment of the present disclosure.

FIG. 2 is a flowchart illustrating a process of producing a digital holographic content according to an exemplary embodiment of the present disclosure. Referring to FIG. 2, first, 3D information on a real object is acquired from a camera and an image sequence and 3D information on a virtual object is acquired from a 3D modeling tool. (S201).

Thereafter, a digital holographic (DH) content is generated by mathematically modeling a process in which a hologram is optically generated by a coherent light source by using the acquired 3D information (S202). Next, the generated digital holographic content is edited by methods including cutting, matching, merging, synthesizing, scaling, and the like (S203).

Meanwhile, an image is restored by visualizing the generated digital holographic content by a computer graphic technique or optically (S204), and multi-sensor information and multi and dual spaces by a digital hologram are recognized and an interaction is processed. An image quality of the restored digital hologram is evaluated by analyzing an influence which a hologram of an optical characteristic exerts on a human visual system and a human factor is processed (S205).

The digital holographic content is produced to easily use the digital hologram by application programming according to a guideline in various multimedia application fields (S206).

Table 1 show parameter setting which is usable in order to define each process on a management pipeline of a process management pipeline operating system for producing the digital holographic content as a functional characteristic, and a supported function in a DH content management process operating system according to the exemplary embodiment of the present disclosure. In this case, the parameter setting includes both a system parameter and a physical parameter, and the functions may include both a process management function and a simulation function.

| CLASSIFICATION | SYSTEM PARAMETER | PHYSICAL PARAMETER | FUNCTION PROCESS MANAGEMENT | | SIMULATION |
|---|---|---|---|---|---|
| 3D IMAGE INFORMATION ACQUIRING UNIT | DISCRIMINATION OF REAL AND VIRTUAL OBJECTS, NUMBER OF VIEWPOINTS, ACQUISITION METHOD, VIEWING ANGLE OF CAMERA LIGHT SOURCE POSITION, DEPTH MAP RESOLUTION, COLOR MAP RESOLUTION | INPUT SPECIFICATION OF CAMERA: DEPTH CAMERA (RESOLUTION, SIZE, VELOCITY), STEREO CAMERA (RESOLUTION, SIZE, VELOCITY) | STORING IMAGE INFORMATION OUTPUTTING 3D IMAGE INFORMATION (TRIANGULAR MESH, 3D MODELING TOOL INTERWORKING) | GENERATION OF PROJECT/ AUTOMATION OF DATA STORAGE ROUTE/SETTING TASK AUTHORITY/ MANAGEMENT OF DIGITAL HOLOGRAM FILE/ | SETTING PARAMETER, ACQUISITION RESULT (DEPTH MAP, COLOR MAP) PRE-VIZ, PREDICTION OF EXTRACTION VELOCITY |
| COMPUTER-GENERATED HOLOGRAM (CGH) PROCESSING UNIT | POINT LIGHT SOURCE/TRIANGULAR MESH SAMPLING RATE, OPTICAL WAVE DIFFRACTION/APPROXIMATION METHOD, MODEL OF 3D IMAGE OPTICAL WAVE, SPECIFICATION OF PARALLEL PROCESSING SYSTEM, TARGET GENERATION VELOCITY, HOLOGRAM SIZE, HOLOGRAM FORMAT, VIEWING ANGLE (FoV) | HOLOGRAM PLANE DISTANCE, OFF-AXIS ANGLE | INPUTTING 3D IMAGE INFORMATION, STORING MASS HOLOGRAM DATA, STORING CCD INPUT CONVERSION, OUTPUTTING HOLOGRAPHIC PATTERN | MANAGEMENT OF REFERENCE BASED WORK | SETTING PARAMETER, PREDICTION OF RESTORED HOLOGRAM SPECIFICATION, HOLOGRAM PRE-VIZ, PREDICTION OF GENERATION TIME, PREDICTION OF GENERATION VELOCITY |
| DH CONTENT RESTORING UNIT | OPTICAL WAVE RESTORATION OPTICAL MODELING, SPECIFICATION OF PARALLEL PROCESSING SYSTEM, SIZE OF RESTORATION HOLOGRAM, ALLOWANCE PARALLAX TYPES, RESOLUTION OF DISPLAY DEVICE, RESTORATION VELOCITY, SPATIAL RESOLUTION, IMAGE SIZE, VIEWING ANGLE, IMAGE BUOYANCE DISTANCE | USED LIGHT SOURCE, DIAMETER OF OBJECTIVE LENS, SCREEN SIZE, FOCUS DISTANCE, SLM CHARACTERISTICS (DIFFRACTION ANGLE AND PIXEL PITCH), OPTICAL WAVELENGTH | CCD INPUT/CGH SYNTHESIZING | | PARAMETER SETTING, EDITION RESULT PRE-VIZ, ESTIMATING EDITION VELOCITY |
| DH CONTENT EDITING UNIT | EDITION SUPPORTING FUNCTION, SUPPORTED ADDITION CONTENT TYPE, EDITION VELOCITY | EDITION DOMAINS (DEPTH MAP AND A FRINGE PATTERN) | CUTTING, SYNTHESIZING, MERGING, SCALING, STORING ADDITION CONTENT FILE, SETTING | | PARAMETER SETTING, SPECIFICATION OF CGH GENERATION HOLOGRAM, REVERSE TRACING, |

-continued

| CLASSIFICATION | SYSTEM PARAMETER | PHYSICAL PARAMETER | FUNCTION | |
| --- | --- | --- | --- | --- |
| | | | PROCESS MANAGEMENT | SIMULATION |
| | | | EDITED DOMAIN | RESTORED HOLOGRAM PRE-VIZ |
| DH CONTENT SPACE RECOGNITION/ INTERACTION | MULTI-SPACE RANGE, MULTI-SPACE MATCHING LEVEL, SPATIAL RESOLUTION, INTERACTION TYPE | MULTI-SENSOR TYPE, POSITIONS/NUMBER OF SENSORS, VIEWING DISTANCE | SETTING SPACE RECOGNITION RANGE, SETTING INTERACTION FUNCTION | MULTI-SPACE RANGE DEFINITION MODELING FUNCTION |
| DH CONTENT IMAGE QUALITY EVALUATION/ HUMAN FACTOR PROCESSING UNIT | SPECKLE NOISE, DIFFRACTION EFFICIENCY | LIGHT SOURCE TYPE, SPATIAL DEPTH RESOLUTION, CFF, HVS MODEL | IMAGE QUALITY EVALUATION PARAMETER ADJUSTING | SYSTEM/ PHYSICAL PARAMETER BASED SIMULATION IMAGE QUALITY EVALUATING AND HUMAN FACTOR INVESTIGATING |
| DH CONTENT PRODUCING UNIT | APPLICATION FIELD, GUIDELINE FUNCTION, SUPPORT PROGRAMMING FUNCTION | DISPLAY SIZE, DISPLAY RESOLUTION, DISPLAY DISTANCE | REFERENCE FOR EACH APPLICATION FIELD | CONTENT PROGRAMMING RESULT PRE-VIZ, SYSTEM PARAMETER REVERSE TRACING |

In table 1, the system parameter and the physical parameter need to be considered at the time of design and implement each process according to the exemplary embodiment and further, the process management function and the simulation function include items to be supported in the process management pipeline operating system for producing the digital holographic content. However, the items which need to be considered to implement the process management pipeline operating system for producing the digital holographic content are not limited to the presented items, but may be variously extended and modified within the scope without departing from a technical concept of the present disclosure.

First, the system parameter of the 3D image information acquiring unit 101 may include discrimination of the real and virtual objects, the number of viewpoints, an acquisition method, a viewing angle of the camera (FoV), the position of the light source, a depth map, the position of the light source, depth map resolution, color map resolution, and the like, and the physical parameter may include a specification of an input camera, for example, the resolution, size, and velocity of a depth camera, the resolution, size, and velocity of the stereo camera, and the like. The function managed by the process managing unit 107 in the 3D image information acquiring unit 101 includes storing image information, outputting 3D image information (point cloud and triangular mesh), 3D modeling tool interwork, and the like, and the simulation function includes parameter setting, acquisition result (a depth map and a color map), Pre-Viz, an extraction velocity predicting function, and the like.

Next, the system parameter of the computer-generated hologram processing unit 102 may include a point light source/triangular mesh sampling rate, an optical wave diffraction/approximation method, a model of a 3D image optical wave, a specification of a parallel processing system, a target generation velocity, a hologram size, a hologram format, a viewing angle (FoV), and the like, and the physical parameter may include a hologram plane distance, an off-axis angle, and the like. The function managed by the process managing unit 107 in the computer-generated hologram processing unit 102 includes inputting the 3D image information, storing mass hologram data, storing CCD input conversion, outputting a holographic fringe pattern, and the like, and the simulation function includes parameter setting, predicting a specification of the restored hologram, generated hologram pre-viz, predicting a generation time, predicting a generation velocity, and the like.

Next, the system parameter of the DH image restoring unit 104 may include optical wave restoration optical modeling, a specification of a parallel processing system, the size of the restored hologram, allowance parallax types (FP, HPO, and the like), the resolution of a display device, a restoration velocity, spatial resolution, an image size, a viewing angle, an image buoyance distance, and the like, and the physical parameter may include a used light source, the diameter of an objective lens, a screen size, a focus distance, SLM characteristics (a diffraction angle and a pixel pitch), an optical wavelength, and the like. The function managed by the process managing unit 107 in the DH image restoring unit 104 includes a CCD input/CGH synthesizing function, and the simulation function includes parameter setting, edition result pre-viz, estimating the edition velocity, and the like.

Next, the system parameter of the DH content editing unit 103 may include an edition supporting function, a supported addition content type, an edition velocity, and the like, and the physical parameter may include edition domains (a depth map and a fringe pattern), and the like. The function managed by the process managing unit 107 in the DH content editing unit 103 includes functions of cutting, synthesizing, merging, scaling, storing an addition content file, setting an edited domain, and the like, and the simulation function includes functions of parameter setting, a specification of a CGH generation hologram, reverse tracing, restored hologram pre-viz, and the like.

Next, the system parameter of the DH content spatial perception/interaction unit 106 may include a multi-space range, a multi-space matching level, spatial resolution, an interaction type, and the like, and the physical parameter may include a multi-sensor type, the positions/the number of sensors, a viewing distance, and the like. The function managed by the process managing unit 107 in the DH content spatial perception/interaction unit 106 includes functions of setting a spatial perception range, setting an interaction function, and the like, and the simulation function includes a multi-space range definition modeling function, and the like.

Next, the system parameter of the DH content image quality evaluation/human factor processing unit 108 may include speckle noise, diffraction efficiency, and the like, and the physical parameter may include a light source type, spatial depth resolution, CFF, an HVS model, and the like. The function managed by the process managing unit 107 in the DH content image quality evaluation/human factor processing unit 108 includes an image quality parameter adjusting function, and the like, and the simulation function includes system/physical parameter based simulation image quality evaluating and human factor investigating functions, and the like.

Lastly, the system parameter of the DH content producing unit 105 may include an application field, a guideline function, a support programming function, and the like, and the physical parameter may include a display size, display resolution, a display distance, and the like. The function managed by the process managing unit 107 in the DH content producing unit 105 includes a reference function for each application field, and the like, and the simulation function includes content programming result pre-viz, a system parameter reverse tracing function, and the like.

FIG. 3 is a diagram illustrating an example of a 3D image application service which is implementable by a process management pipeline operating system for producing a digital holographic content according to the exemplary embodiment of the present disclosure. Referring to FIG. 3, the 3D image application service may be used to restore and display cultural assets/history and display sightseeing/culture/art works by constructing digital information display (DID) exclusively for the DH content in a public field, and display and construct an education content by a media table.

A retail shop product/brand service by constructing a kiosk-type small-sized display, and an exposure-type advertisement model by multiplex theater chain ticketing and providing a user-customized content may be operated, and further, the 3D image application service may be applied to implementation of a 3D service in an art/concert/entertainment field by constructing a space holder, a media wall, and a façade which are image presenting spaces.

In order to implement the 3D image service illustrated in FIG. 3, a similar hologram technique was generally applied and there was no method of consistently performing all the processes for processing the digital holographic content, in the related art. As a result, there was a limit in efficiently constructing a 3D image service specialized for each application field by handling a function for each process in individual off-line schemes. However, as described above, all the processes for each processing are processed in the pipeline scheme by the process managing unit 107, such that all related processes from generation of the 3D image content to production of the application content may be consistently and seamlessly processed and operated on one system. Moreover, the user-friendly user-created content (UCC) environment may be constructed, which the digital hologram may be efficiently by a content producer and a content user in various application fields as illustrated in FIG. 3.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system for producing a digital holographic content, comprising:
    a 3D image information acquiring unit configured to acquire 3D image information on real and virtual objects;
    a computer-generated hologram (CGH) processing unit configured to generate the digital holographic (DH) content from the 3D image information acquired from the 3D image information acquiring unit by mathematical modeling;
    a DH content editing unit configured to edit the generated digital holographic content;
    a DH image restoring unit configured to visualize the generated digital holographic content in a 3D image; and
    a digital holographic content process managing unit configured to manage parameters and a processing time of each functioning unit so as to perform in a pipeline scheme each step processed by the 3D image information acquiring unit, the computer-generated hologram processing unit, the digital holographic content editing unit, and the digital hologram image restoring unit,
    wherein the digital holographic content process managing unit parameterizes functional characteristics of said each step processed by the 3D image information acquiring unit, the computer-generated hologram processing unit, the digital holographic content editing unit, and the digital hologram image restoring unit, and
    wherein the parameters include a system parameter, a physical parameter, a process management function parameter and a simulation function parameter.

2. The system of claim 1, further comprising:
    a DH content spatial perception and interaction unit configured to perform a multi and dual spatial perception function and interaction processing by multi-sensor information and the digital hologram by interworking with the digital hologram image restoring unit in accordance with a control signal of the digital holographic content process managing unit.

3. The system of claim 2, wherein:
    the digital hologram spatial perception and interaction unit defines 3D spatial information by multi-sensors such as an existing camera and an IR sensor and spatial information by the digital hologram, recognizes extended multiple spatial information by merging two spaces, and distinguishes and recognizes a user's operation in an extended 3D space, when the digital holographic content restored in the 3D image is operated.

4. The system of claim 1, further comprising:
    a digital hologram image quality evaluating/human factor processing unit configured to perform evaluation of an image quality and processing of a human factor by analyzing a characteristic of the digital hologram by receiving digital hologram data from the digital hologram image restoring unit or the digital content editing unit.

5. The system of claim 1, further comprising:
a DH content producing unit configured to produce the digital hologram as a content which is usable in a corresponding application field by receiving production guideline data for each application field.

6. The system of claim 5, wherein:
the digital holographic content producing unit produces and processes an applied digital hologram by user-friendly user-created content (UCC) environment based application programming in accordance with guideline information corresponding to each multimedia application field.

7. The system of claim 1, wherein:
the 3D image information acquiring unit acquires a real object from a camera and an image sequence, and acquires 3D image information on a virtual object in a dual mode as data types of a depth map and an RGB map from a 3D modeling tool.

8. The system of claim 1, wherein:
the computer-generated hologram processing unit generates the digital holographic (DH) content by mathematically modeling a process in which a hologram is optically generated by a coherent light source with the acquired 3D image information.

9. The system of claim 1, wherein:
the digital holographic content editing unit serves to perform an edition function through at least one selected from cutting, matching, merging, synthesizing, and scaling on a depth map domain or a fringe pattern domain.

10. The system of claim 1, wherein:
the digital hologram image restoring unit visualizes the generated digital holographic content in a 3D image by a computer graphics rendering technique through tracking light wavefront reflected on an object and an analog optical processing method of projection of a reproduction wave.

11. The system of claim 1, wherein the system parameter for the 3D image information acquiring unit includes discrimination of the real and virtual objects, a number of viewpoints, an acquisition method, a viewing angle (FoV) of a camera, a position of a light source, a depth map, depth map resolution, and color map resolution, and the physical parameter for the 3D image information acquiring unit includes a specification of an input camera.

12. The system of claim 11, wherein the process management function parameter for the 3D image information acquiring unit includes storing image information, outputting the 3D image information, and 3D modeling tool interwork, and the simulation function parameter for the 3D image information acquiring unit includes parameter setting, acquisition result including a depth map and a color map, previsualization (Pre-Viz), and an extraction velocity predicting function.

13. The system of claim 1, wherein the system parameter for the computer-generated hologram processing unit includes a point light source/triangular mesh sampling rate, an optical wave diffraction/approximation method, a model of a 3D image optical wave, a specification of a parallel processing system, a target generation velocity, a hologram size, a hologram format, and a viewing angle (FoV), and the physical parameter for the computer-generated hologram processing unit includes a hologram plane distance and an off-axis angle.

14. The system of 13, wherein the process management function parameter for the computer-generated hologram processing unit includes inputting the 3D image information, storing mass hologram data, storing charge-coupled device (CCD) input conversion, and outputting a holographic fringe pattern, and the simulation function parameter for the computer-generated hologram processing unit includes parameter setting, predicting a specification of a restored hologram, generated hologram previsualization (pre-viz), predicting a generation time, and predicting a generation velocity.

15. The system of claim 1, wherein the system parameter for the DH image restoring unit includes optical wave restoration optical modeling, a specification of a parallel processing system, the size of a restored hologram, allowance parallax types, the resolution of a display device, a restoration velocity, spatial resolution, an image size, a viewing angle (FoV), and an image buoyance distance, and the physical parameter for the DH image restoring unit includes a used light source, a diameter of an objective lens, a screen size, a focus distance, a diffraction angle, a pixel pitch, and an optical wavelength.

16. The system of claim 15, wherein the process management function parameter for the DH image restoring unit includes a charge-coupled device (CCD) input/CGH synthesizing function, and the simulation function parameter for the DH image restoring unit includes parameter setting, edition result previsualization (pre-viz), and estimating an edition velocity.

17. The system of claim 1, wherein the system parameter for the DH content editing unit includes an edition supporting function, a supported addition content type, and an edition velocity, and the physical parameter for the DH content editing unit includes edition domains including a depth map and a fringe pattern.

18. The system of claim 17, wherein the process management function parameter for the DH content editing unit includes functions of cutting, synthesizing, merging, scaling, storing an addition content file, and setting an edited domain, and the simulation function parameter for the DH content editing unit includes functions of parameter setting, a specification of a CGH generation hologram, reverse tracing, and restored hologram previsualization (pre-viz).

* * * * *